(12) United States Patent
Coyle

(10) Patent No.: US 7,941,968 B1
(45) Date of Patent: May 17, 2011

(54) PLANT WATERING TRELLIS APPARATUS

(76) Inventor: Richard A. Coyle, Boynton Beach, FL (US)

( * ) Notice: Subject to any disclaimer, the term of this patent is extended or adjusted under 35 U.S.C. 154(b) by 28 days.

(21) Appl. No.: 12/613,797

(22) Filed: Nov. 6, 2009

(51) Int. Cl.
*A01G 17/06* (2006.01)

(52) U.S. Cl. .................................. 47/45; 47/47; 47/48.5

(58) Field of Classification Search ............... 47/42, 44, 47/45, 46, 47, 48.5; 239/273, 276; D25/100
See application file for complete search history.

(56) References Cited

U.S. PATENT DOCUMENTS

| | | | | |
|---|---|---|---|---|
| 199,353 | A * | 1/1878 | Clark | 47/45 |
| 2,990,647 | A * | 7/1961 | Himebaugh | 47/47 |
| 3,166,869 | A * | 1/1965 | Luper | 47/47 |
| 3,357,129 | A * | 12/1967 | Torrence | 47/79 |
| 3,579,908 | A | 5/1971 | Morgan | |
| 3,752,472 | A * | 8/1973 | Snead | 482/35 |
| 4,922,653 | A * | 5/1990 | Stone | 47/45 |
| 5,007,587 | A | 4/1991 | Daroca | |
| 5,357,710 | A | 10/1994 | Dulik et al. | |
| 5,480,336 | A * | 1/1996 | Blanchard | 446/89 |
| 5,638,843 | A * | 6/1997 | Strickland | 134/123 |
| 5,820,472 | A * | 10/1998 | Briggs | 472/128 |
| 5,862,625 | A * | 1/1999 | Parker | 47/47 |
| 5,881,495 | A * | 3/1999 | Clark | 47/48.5 |
| 5,913,477 | A | 6/1999 | Dean | |
| D451,298 | S | 12/2001 | Thomas | |
| D466,765 | S * | 12/2002 | Barbi et al. | D8/1 |
| D469,848 | S * | 2/2003 | Funk | D23/214 |
| 7,017,299 | B1 * | 3/2006 | Speed et al. | 47/44 |
| D592,317 | S * | 5/2009 | Padden | D25/100 |
| 7,707,772 | B1 * | 5/2010 | Baird | 47/48.5 |
| 2006/0022066 | A1 * | 2/2006 | Jerstad | 239/276 |
| 2007/0101645 | A1 * | 5/2007 | Christopher et al. | 47/67 |

FOREIGN PATENT DOCUMENTS

| | | | | |
|---|---|---|---|---|
| GB | 2179834 | A | * | 3/1987 |
| GB | 2253126 | A | * | 9/1992 |
| GB | 2273233 | A | * | 6/1994 |
| GB | 2280583 | A | * | 2/1995 |

* cited by examiner

*Primary Examiner* — Francis T Palo
(74) *Attorney, Agent, or Firm* — Crossley Patent Law; Mark A. Crossley

(57) ABSTRACT

The plant watering trellis apparatus provides both a trellis for plant support and a plant watering means. The collection tray is sized with a width about equal to the top width of the apparatus so that rain collection is also an option, as well as hand or automated filling from another source. Transparency of the vertical supply tubes allows a user to visually determine the water level within the apparatus. Legs are inserted into a given soil for apparatus support. The valves in the delivery tubes control drip and rate of drip from the delivery block orifices so that monitoring water supply to plants is needed only at the outset in determining best plant water supply. After setting, the apparatus can be conveniently left unattended. The delivery blocks are relatively heavy so the delivery tubes are downwardly extended. The planar apparatus is easily located and used.

4 Claims, 4 Drawing Sheets

US 7,941,968 B1

PLANT WATERING TRELLIS APPARATUS

BACKGROUND OF THE INVENTION

Plant support devices are well known in the arts. Many plants, especially fruit and vegetable bearing plants, require support. Additionally, supporting plants often provides the desired visual effect and plant display. Supporting a plant away from the soil is also often desirable and necessary. Further, except in unusual circumstances, plants must be watered, and many quite frequently. Frequent watering is not only time consuming but sometimes impossible due to owner absence and the like. It is therefore desirable to provide a plant support that also provides automatic watering. The present apparatus provides a basic plant support with automatic plant watering and visual feedback of water supply level.

FIELD OF THE INVENTION

The plant watering trellis apparatus relates to plant support devices and more especially to a plant watering trellis apparatus that provides both support and watering.

SUMMARY OF THE INVENTION

The general purpose of the plant watering trellis apparatus, described subsequently in greater detail, is to provide a plant watering trellis apparatus which has many novel features that result in an improved plant watering trellis apparatus which is not anticipated, rendered obvious, suggested, or even implied by prior art, either alone or in combination thereof.

To attain this, the plant watering trellis apparatus provides both a trellis for plant support and a watering means. The collection tray is sized with a width about equal to the top width of the apparatus so that rain collection is also an option, as well as hand or automated filling from another source. The apparatus can be jointed between the central vertical support and the horizontal supports and between the vertical supply tubes and the horizontal supports, or can be mostly continuous. Optional transparency of the vertical supply tubes allows a user to visually determine the water level within the apparatus. Legs are inserted into a given soil for apparatus support. The valves in the delivery tubes control drip and rate of drip from the delivery block orifices so that monitoring water supply to plants is needed only at the outset in determining best plant water supply. After setting, the apparatus can be conveniently left unattended. The delivery blocks are relatively heavy so the delivery tubes are downwardly extended. The planar apparatus is easily located and used.

Thus has been broadly outlined the more important features of the improved plant watering trellis apparatus so that the detailed description thereof that follows may be better understood and in order that the present contribution to the art may be better appreciated.

An object of the plant watering trellis apparatus is to provide vertical support for a plant.

Another object of the plant watering trellis apparatus is to automatically water a plant.

A further object of the plant watering trellis apparatus is to provide visual feedback of water level within the apparatus.

An added object of the plant watering trellis apparatus is to provide easy filling of the apparatus.

A further object of the plant watering trellis apparatus is to negate the need for a plant tender's constant attention to watering.

Yet another object of the planter watering trellis apparatus is to efficiently collect rainwater for watering plants.

These together with additional objects, features and advantages of the improved plant watering trellis apparatus will be readily apparent to those of ordinary skill in the art upon reading the following detailed description of presently preferred, but nonetheless illustrative, embodiments of the improved plant watering trellis apparatus when taken in conjunction with the accompanying drawings.

In this respect, before explaining the current embodiments of the improved plant watering trellis apparatus in detail, it is to be understood that the plant watering trellis apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved plant watering trellis apparatus. It is therefore important that the claims be regarded as including such equivalent constructions insofar as they do not depart from the spirit and scope of the plant watering trellis apparatus. It is also to be understood that the phraseology and terminology employed herein are for purposes of description and should not be regarded as limiting.

DETAILED DESCRIPTION OF THE DRAWINGS

Figure 1:
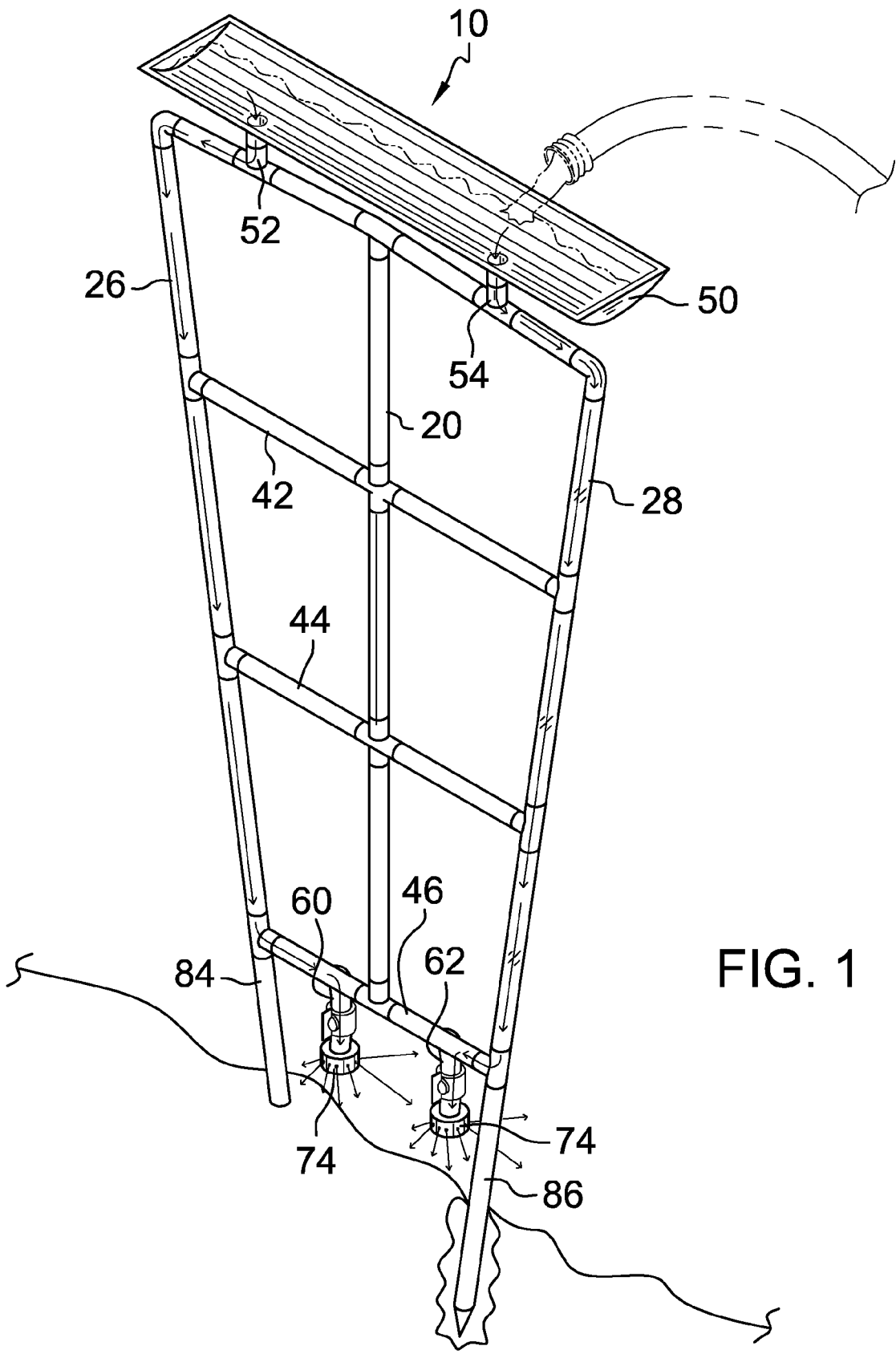
FIG. 1 is a front perspective view.

With reference now to the drawings, and in particular FIG. 1 thereof, the principles and concepts of the plant watering trellis apparatus generally designated by the reference number 10 will be described.

Figure 2:
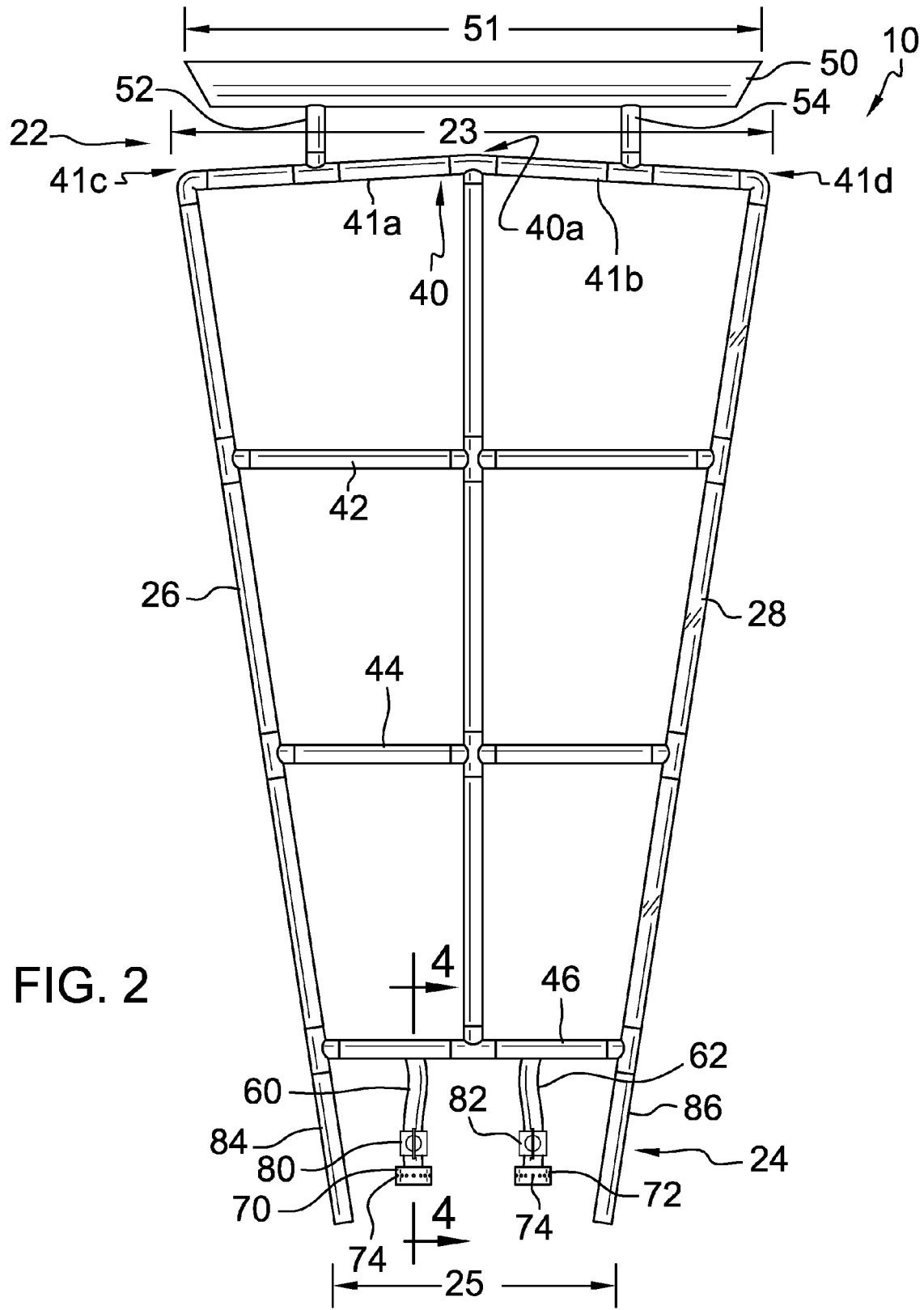
FIG. 2 is a front elevation view.

Referring to FIGS. 1 and 2, the apparatus 10 partially comprises the top 22 spaced apart from the bottom 24. The top 22 has a top width 23 greater than a bottom width 25 of the bottom 24. The hollow first horizontal support 40 comprises a first half 41*a* and a second half 41*b* joined at the central vertical support 20. The first horizontal support 40 has a center height 40*a* between two identical opposite lateral heights comprising a first lateral height 41*c* spaced apart from a second lateral height 41*d*. The center height 40*a* is greater than the lateral heights.

Continuing to refer to FIG. 2, the hollow first supply tube 52 is disposed atop the first half 41*a* of the first horizontal support 40. The hollow second supply tube 54 is disposed atop the first horizontal support 40 second half 41*b*. The collection tray 50 is disposed atop the supply tubes. The collection tray 50 has a tray width 51 about equal to the top width 23. The hollow first vertical supply tube 26 is downwardly affixed to the first horizontal support 40 first half 41*a*. The first vertical supply tube 26 is ideally transparent. The hollow transparent second vertical supply tube 28 is downwardly affixed to the first horizontal support 40 second half 41*b*.

The second vertical supply tube 28 is ideally transparent. The hollow fourth horizontal support 46 is disposed between the first vertical supply tube 26 and the second vertical supply tube 28, at the bottom 24. The pair of additional hollow horizontal supports comprises the second horizontal support 42 spaced apart from the third horizontal support 44. The second horizontal support 42 and third horizontal support 44 are equidistantly spaced between the first horizontal support 40 and the fourth horizontal support 46.

Figure 3:
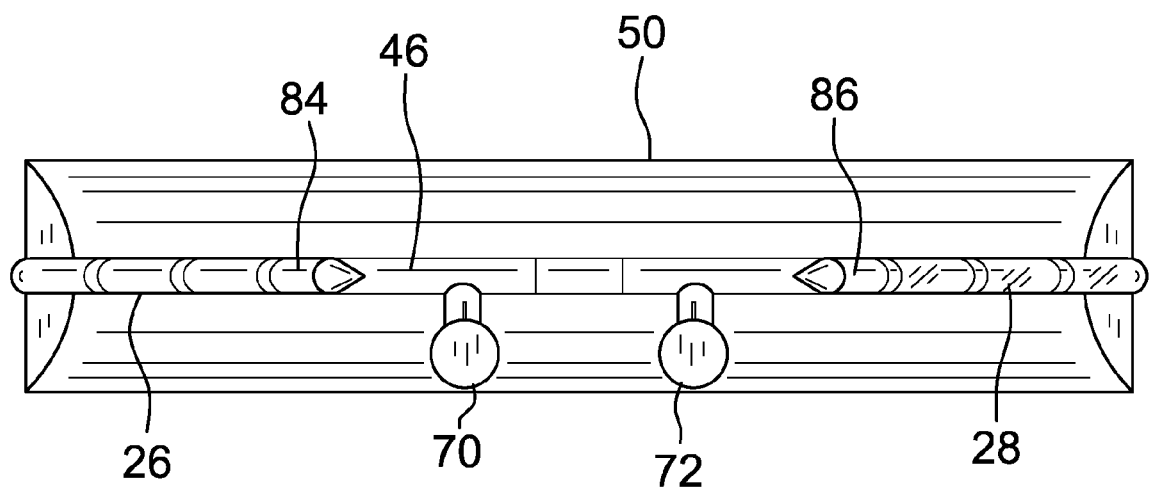
FIG. 3 is a bottom plan view.
Figure 4:
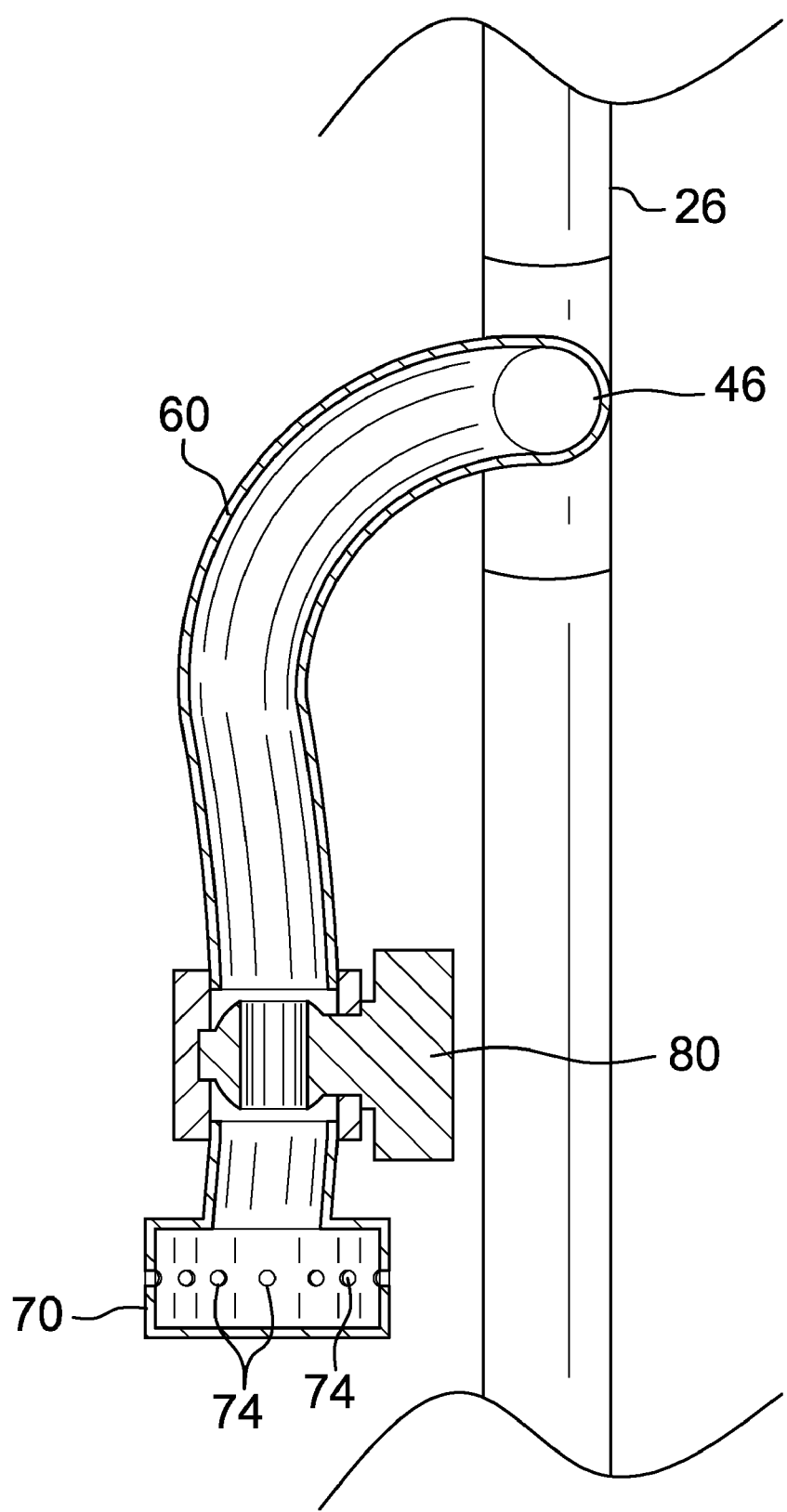
FIG. 4 is partial cross sectional view of FIG. 2, taken along the line 4-4.

Referring again to FIG. 2 and also to FIGS. 3 and 4, the pair of legs partially comprise the first leg 84 extended from the first vertical supply tube 26 bottom 24. The second leg 86 is extended from the second vertical supply tube 28 bottom 24. The legs provide a means for anchoring the apparatus 10 into soil. The first delivery tube 60 is spaced apart from the second delivery tube 62. Each delivery tube is disposed downwardly from the fourth horizontal support 46. The pair of identical hollow delivery blocks comprises the first delivery block 70 affixed to the first delivery tube 60 and the second delivery block 72 affixed to the second delivery tube 62. A plurality of spaced apart block orifices 74 is disposed within each of the delivery blocks. Water is collected in the collection tray 50 and delivered to the delivery blocks, from thence gradually and constantly dripped from the block orifices 74 to the soil. The first valve 80 is disposed in the first delivery tube 60. The second valve 82 is disposed in the second delivery tube 62. Controlling the valves provides for partial shutoff or total shutoff of water drip from the apparatus 10.

With respect to the above description then, it is to be realized that the optimum dimensional relationships for the parts of the plant watering trellis apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the plant watering trellis apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the plant watering trellis apparatus may be used.

Therefore, the foregoing is considered as illustrative only of the principles of the plant watering trellis apparatus. Further, since numerous modifications and changes will readily occur to those skilled in the art, it is not desired to limit the plant watering trellis apparatus to the exact construction and operation shown and described, and accordingly, all suitable modifications and equivalents may be resorted to, falling within the scope of the plant watering trellis apparatus.

What is claimed is:

1. A plant watering trellis apparatus, comprising, in combination:
   a top spaced apart from a bottom, the top having a top width greater than a bottom width of the bottom;
   a hollow central vertical support;
   a hollow first horizontal support having a center height between two identical opposite lateral heights comprising a first lateral height spaced apart from a second lateral height, the center height being greatest, the first horizontal support further comprising a first half and a second half joined at the center height;
   a hollow first supply tube disposed atop the first half;
   a hollow second supply tube disposed atop the second half;
   a collection tray disposed atop the supply tubes, the collection tray having a tray width about equal to the top width;
   a hollow first vertical supply tube downwardly affixed to the first horizontal support first half;
   a hollow second vertical supply tube downwardly affixed to the first horizontal support second half;
   a hollow fourth horizontal support disposed between the first vertical supply tube and the second vertical supply tube, at the bottom;
   a pair of hollow horizontal supports comprising a second horizontal support spaced apart from a third horizontal support, the second and third horizontal supports equidistantly spaced between the first horizontal support and the fourth horizontal support;
   a first leg extended from the first vertical supply tube bottom;
   a second leg extended from the second vertical supply tube bottom;
   a hollow first delivery tube spaced apart from a hollow second delivery tube, each delivery tube disposed downwardly from the fourth horizontal support;
   a pair of identical hollow delivery blocks, comprising a first delivery block affixed to the first delivery tube, a second delivery block affixed to the second delivery tube;
   a plurality of spaced apart block orifices disposed within each of the delivery blocks;
   whereby water is collected in the collection tray and delivered to the delivery blocks, from thence gradually and constantly dripped from the block orifices.

2. The apparatus according to claim 1 further comprising a first valve in the first delivery tube;
   a second valve in the second delivery tube.

3. The apparatus according to claim 1 wherein the first vertical supply tube is further transparent;
   the second vertical supply tube is further transparent.

4. The apparatus according to claim 2 wherein the first vertical supply tube is further transparent;
   the second vertical supply tube is further transparent.

* * * * *